Aug. 21, 1956  K. A. KNUTSEN  2,759,669
ERROR CHECKING DEVICE FOR RECORD-CONTROLLED
ACCOUNTING MACHINE
Filed Oct. 17, 1950  7 Sheets-Sheet 3

INVENTOR
KNUT ANDREAS KNUTSEN
By:
Haseltine, Lake & Co.
AGENTS

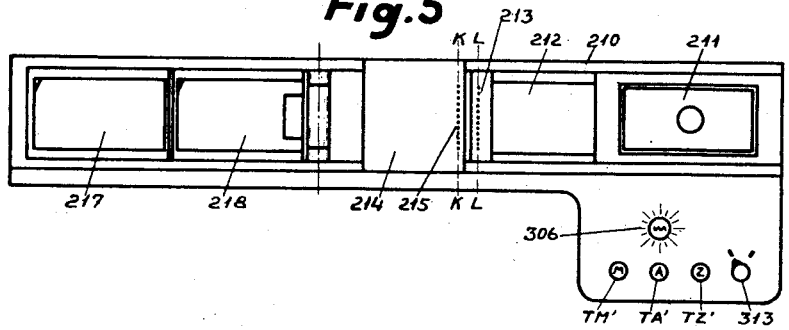
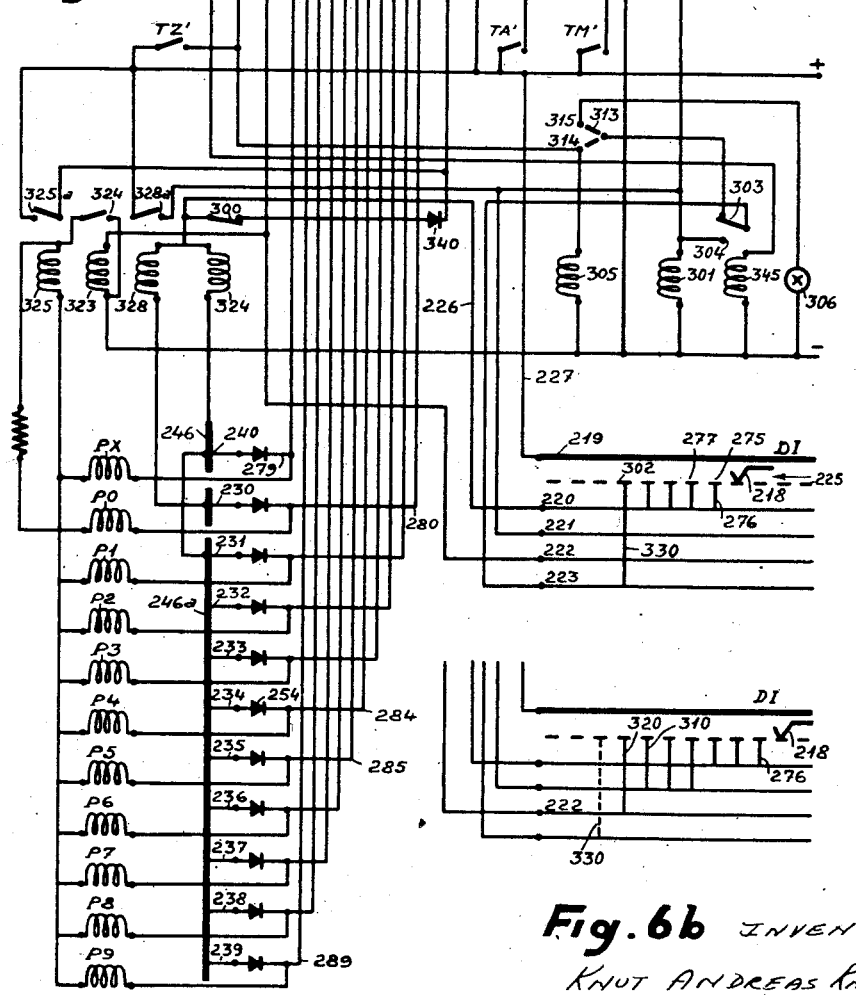

Aug. 21, 1956

K. A. KNUTSEN 2,759,669

ERROR CHECKING DEVICE FOR RECORD-CONTROLLED
ACCOUNTING MACHINE

Filed Oct. 17, 1950

INVENTOR
KNUT ANDREAS KNUTSEN

BY:

Hazeltine, Lake & Co.

AGENTS

Aug. 21, 1956
K. A. KNUTSEN
2,759,669
ERROR CHECKING DEVICE FOR RECORD-CONTROLLED
ACCOUNTING MACHINE
Filed Oct. 17, 1950
7 Sheets-Sheet 7
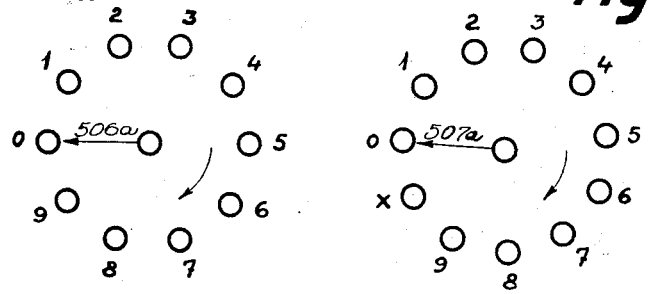
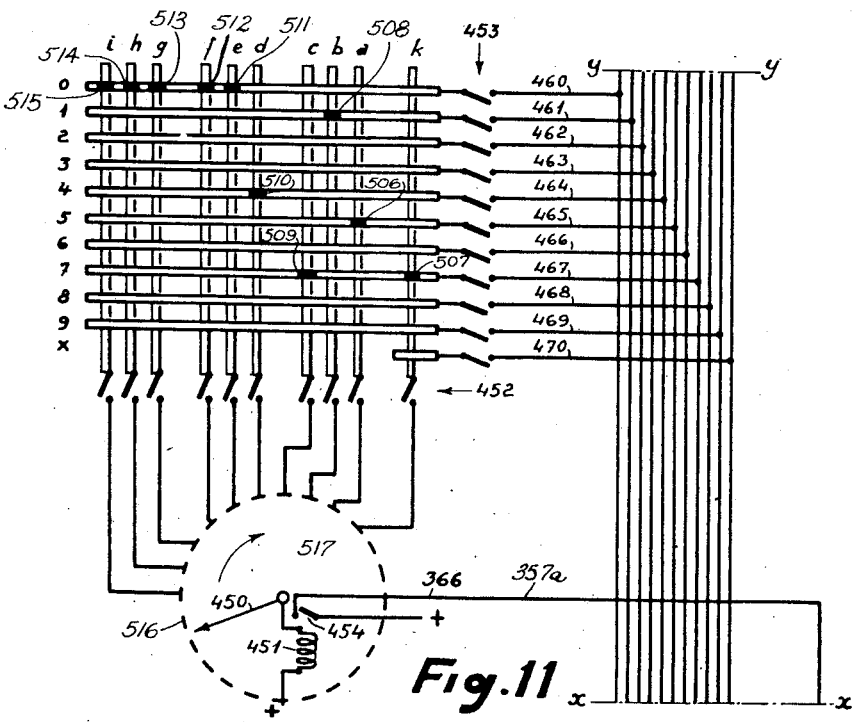
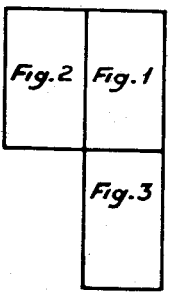
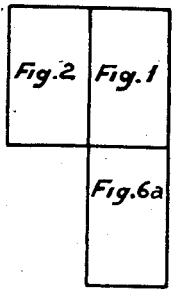
INVENTOR
KNUT ANREAS KNUTSEN
BY
Hultine, Lake & Co.
AGENTS

United States Patent Office 2,759,669
Patented Aug. 21, 1956

2,759,669
ERROR CHECKING DEVICE FOR RECORD-CONTROLLED ACCOUNTING MACHINE

Knut Andreas Knutsen, Paris, France, assignor to Compagnie des Machines Bull (Societe Anonyme), Paris, France, a company of France Application October 17, 1950, Serial No. 190,507

Claims priority, application France November 9, 1949

13 Claims. (Cl. 235—61.7)

This invention relates to a method of avoiding errors in accounting machines, and means for carrying out the said method. More particularly, the invention is concerned with a method and means for avoiding error in machines of the type in which data, more particularly figures, are recorded on cards, strips or the like, in the form of, for example perforations, impressions or dots.

According to the invention, the checking of the positioning of the marks representing the figures on record cards or the like consists in the addition to each recorded number, the accuracy of which is to be determined, an additional characteristic mark corresponding to a figure, which imparts to the complete number formed by the combination of the figures of the number and of the characteristic figure a simple constant arithmetical property, which the accounting machine verifies by means specially provided for this purpose. The additional figure, preferably a single integer, thus added will, for the sake of simplicity, hereinafter be referred to as the "checking symbol."

It may thus be imagined, for example, that owing to the addition of a checking symbol the total sum of the figures recorded on the record card is constant and equal to a predetermined value, or that the complete number formed is divisible by 9, 12, etc. If the simple arithmetical property does not tally, which can be readily checked on an accounting machine in which record cards are employed by means similar to those forming the subject of the invention, an immediate indication is obtained that an error has occurred in the recording of the number on the card.

In particular, the preferred checking method according to the invention is based upon the addition of a checking symbol which makes the total number recorded on the card divisible by 11.

It is, in fact, known to exploit the divisibility of a number by 11 for the purpose of checking arithmetical or recording operations, but these operations have not yet been effected on recording cards for the purpose of such checking. Moreover, since the addition of a supplementary mark corresponding ot the checking symbol on the record card modifies the utilisation of the card—the said symbol being recorded in a special column and read and exploited by special means—the record card constitutes in itself a new industrial product. Consequently, the method of checking according to the invention comprises the use of such a card for exploiting the divisibility of the number by 11, in conjunction with means specially provided for this purpose. It is known that a number is divisible by 11 when the sum of the figures of even denomination in this number is equal to the sum of the figures of uneven denomination or when the difference between these sums is equal to 11 or to a multiple of 11. It must, from the outset, be noted that the numeration basis of the figures to be added under these conditions to the group of figures forming any number is 11, that is to say, it includes the figure 10, which can be represented by any sign. In the following, the sign adopted is the Roman numeral "X."

When a somewhat lengthy decimal number is recorded, the most frequent recording errors which may arise are generally connected with an isolated, incorrect figure, or with two figures which have become transposed. Therefore, by adding to the number in question a "checking symbol" rendering the new number thus obtained divisible by 11, any error in one or more figures or any transposition between two consecutive figures due to the recording destroys the divisibility by 11, which is very quickly revealed by the automatic checking means according to the invention.

Various mechanical forms of checking means exploiting this principle in key-operated accounting machines are known. Attention is directed, for example, to Arthur F. Poole's United States Patents No. 1,283,293, applied for on September 5, 1916, and granted on October 29, 1918, No. 1,519,328, applied for on November 27, 1922, and granted on December 16, 1924, and No. 1,528,567, applied for on November 17, 1921, and granted on March 3, 1925.

The present invention therefore concerns also electric checking means applicable to accounting and statistical machines operated by keys, perforated cards or any other similar means.

In this respect an object of the invention is to provide checking means adapted to be fitted to a machine in which numbers are employed, such means comprising essentially at least one electric impulse counter having eleven positions, without a carry-over device, means for alternately and successively directing to the said impulse counter electric impulses corresponding either to each of the figures of a number, or to the complement to 11 of each of these figures, according to the evenness of the order of these figures, and means employing the symbol finally appearing in the said counter, for a subsequent operation of the machine.

This subsequent operation of the machine may be the displaying of the final symbol, or a checking of the agreement, for the purpose of verifying the final symbol, with a symbol already displayed.

Thus, the electric checking arrangement according to the invention may indicate visually, after treatment of a figure or number to be checked in the machine, the symbol of this check which is to be recorded after the said figure or number, in order to form a number divisible by 11. In this case, the operator can, after observing the visual indication, effect the required recording of the symbol. If the number in question is constituted by a number of figures, the machine gives an indication of the symbol (which may be variable) at any instant during the reading.

The checking arrangement may also comprise means such that, during the checking of a number, the recording of the checking symbol of the number formed by the figures dealt with is automatically controlled. The actual indication of the symbol can then be dispensed with.

Conversely, an electric checking arrangement according to the invention may also control the divisibility by 11 of a number accompanied by its symbol, thus verifying the accuracy of the reading or of the recording of this number and of its checking symbol. On checking of a number followed by its correct symbol, the checking arrangement is returned to zero. This condition shows the accuracy of the number checked and can initiate any operation subordinate to this check. If the opposite is the case, the checking arrangement indicates the error and may stop the machine, or sort out the incorrect cards.

Consequently, the possible applications of the invention to known machines include:

(a) Key-operated punching machines, by means of which the operator can, after having perforated a figure or number, or after having read the corresponding symbol, perforate the latter by striking the key of the figure of the symbol, or perforate the corresponding symbol without reading it by striking a special single key;

(b) Typewriters provided with an electric keyboard by means of which the operator may, after having impressed a figure or number, or after having read the corresponding symbol, impress this symbol by striking the key of the figure of the symbol, or impress the corresponding symbol by striking a particular single key;

(c) Automatically operating punching machines which punch on a card, after a recorded number, in a given zone, the symbol corresponding to that number read by the machine;

(d) Automatically operating checking machines for perforated cards, the said cards bearing in certain zones perforations corresponding to numbers including their symbol, these machines automatically selecting and eliminating, if desired, the cards bearing incorrect particulars.

All of the foregoing said machines, and other similar machines which could be employed according to the invention with known means for feeding cards, exploring the cards, etc., possess, in common, a certain number of fundamental elements which are as follows:

A device for starting and stopping the checking arrangement;

Means for recording and reading the figures e. g., a striking or punching keyboard, exploring brushes, photo-electric devices, and the like;

Means for emitting periodically spaced impulses (e. g. an electro-mechanical rotary change-over switch, as employed in automatic telephony, for example, or an electronic switch, for example of the type comprising a cathode ray tube turning before a multiplicity of output electrodes, or a time base circuit or sweep generator having multiple connections to a retarding line, and the like devices which impulses are successively transmitted through various channels;

A relay selection arrangement;

A two-position switching arrangement;

An impulse counter having a storage capacity of eleven impulses but comprising no carry-over device (e. g., an electro-magnetic rotary switch as employed in automatic telephony, for example, or an electronic switch, with no automatic maintenance of the movement, or a counter formed by a chain of relays, and the like devices);

An output member (e. g., a visual indicator for the checking symbol, or an arrangement for recording the checking symbol by striking or perforating an arrangement for selecting incorrect cards, a device for locking the machine when an error is revealed, etc.).

In the above-mentioned combination of elements, the relay selection arrangement and the switching unit have the object of transmitting the impulses to the counter, alternately in a number equal to the figure entered and in a number equal to its complement to 11, and then causing the output member to mark the symbol in its true magnitude. It is clear, however, that it is possible to replace the counter, the selection arrangement and the switching unit, without departing from the scope of the invention, by any equivalent arrangement for alternately adding and subtracting, or vice versa, the arrangements being specially designed for application to similar perforated-card methods and accounting machines.

The invention also includes means and methods for automatically determining with the record cards or strips, the checking symbol of the result of an arithmetical operation starting from the checking symbols of the numbers set for this operation; the checking of the divisibility by 11 of the number constituted by the result of the operation, accompanied by the symbol thus formed, guarantees the accuracy of the operation; and the proper functioning of the means for reading the numbers set and of the means for calculating and recording the total.

Finally, the invention includes, by way of new industrial products, the perforated cards or strips comprising systematically, in addition to the perforations corresponding to a number, of a complementary perforation corresponding to the symbol of this number.

Further advantages and features of the invention will appear more clearly from the following description and upon reference to the accompanying drawings and diagrams, which show by way of example, simple forms of embodiment.

Figure 1 shows diagrammatically the principle of the transmitting part of a checking unit comprising an automatic telephone selector; the figure also shows the selector relays controlled by the keyboard, a part of the reversing assembly and a number of auxiliary devices.

Figure 2 shows diagrammatically the principle of the counting part of a checking unit, which part receives the impulses transmitted by the selecting transmitter of Figure 1. An automatic telephone selector is also employed for this purpose; Figure 2 also shows an arrangement for indicating the checking symbols and a distributor arranged to control the automatic recording of the checking symbols;

Figure 5 shows in diagrammatic plan view a punching machine provided with a checking arrangement and adapted to punch the checking symbol automatically after recorded numbers, in predetermined zones of perforated cards (this machine can also be employed to check, in predetermined card zones, numbers accompanied by their symbols, and to sort out incorrect cards);

Figure 6a shows a simplified diagram of the essential circuits of a machine such as that shown in Figure 5, acting in association with the checking circuits of Figures 1 and 2;

Figure 6b is a detail showing a modification of the use of the arrangement of Figure 6a;

Figure 11 shows diagrammatically a distributing arrangement for dealing with recorded numbers in the totalisators of a tabulating, calculating or other machine;

Figure 12a shows diagrammatically, in section, a totalisator stage for decimal values;

Figure 12b shows in diagrammatic section a totalisator for symbols;

Figure 13 shows the manner of arranging Figures 1, 2 and 3, to produce the complete diagram for one embodiment of the invention; and Figure 14 is a view similar to Figure 13, illustrating the arrangement of Figures 1, 2 and 6a, to form the diagram for another embodiment of the invention.

Figure 1:
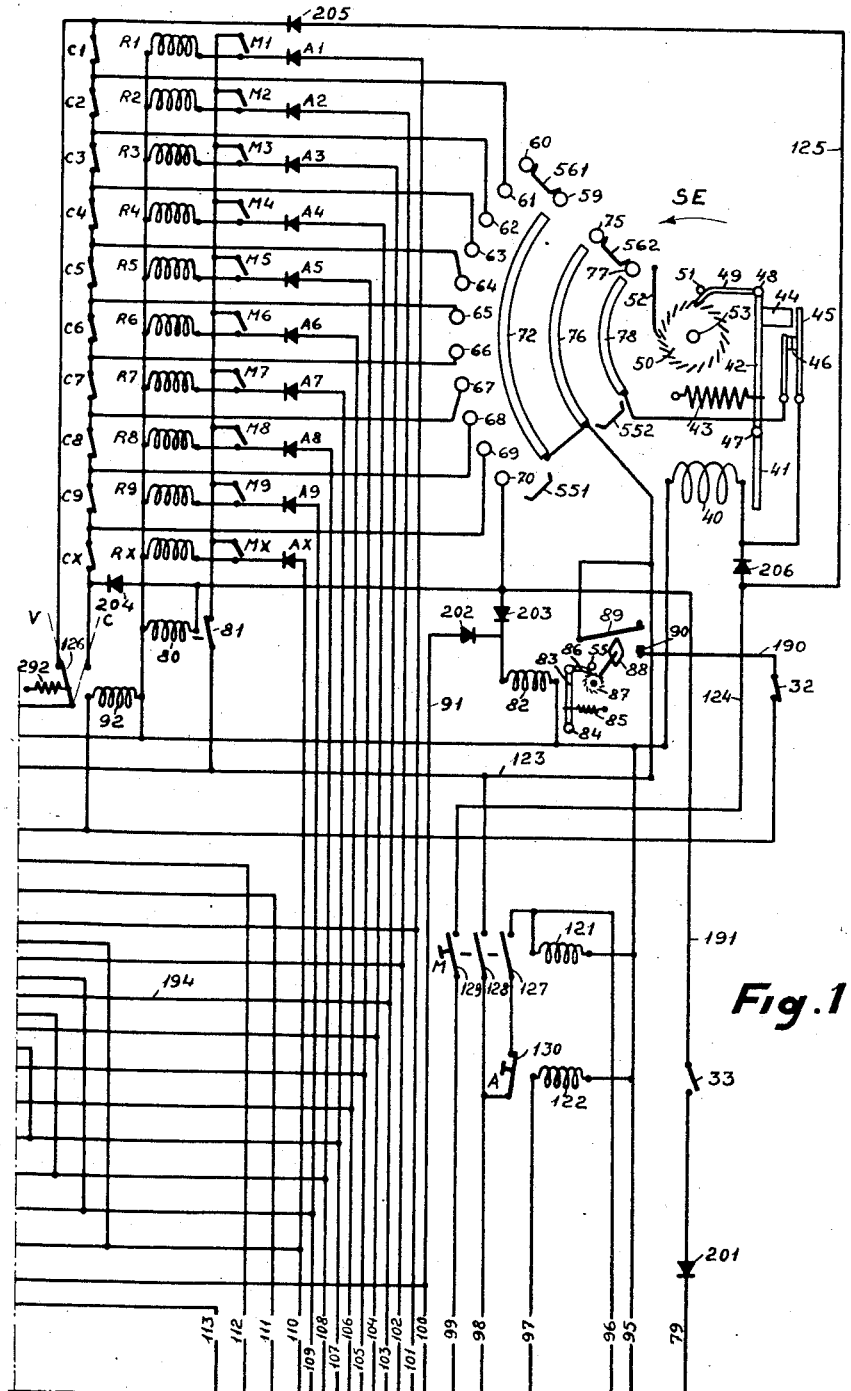

In an installation comprising an electric checking arrangement according to the invention, there is provided (see Figure 4) a checking arrangement connected to an electric punching machine for perforating cards of accounting and statistical machines. A similar arrangement could be applied either to a checking arrangement connected to an accounting machine, or to the keyboard of a typewriter provided with electric impression means.

The card puncher, which is of known type and is referred to as an electric punching machine, comprises a bed 21, a magazine 22 for blank cards, a punching unit 23, a punching track 24, a card-ejecting device 25, a magazine 26 to receive the cards, and a control keyboard 27. The machine illustrated is of the known type in which the cards are automatically fed and ejected. A skip bar or an electric tabulator places the cards automatically in position below the punching mechanism according to the zones to be punched. The machine may also comprise at the same time an arrangement for automatic reproduction by means of a master card. Electric current is fed to the machine by a plug-in cable 28. A junction cable 29 connects the punching machine automatically to the checking unit 30.

Figure 2:
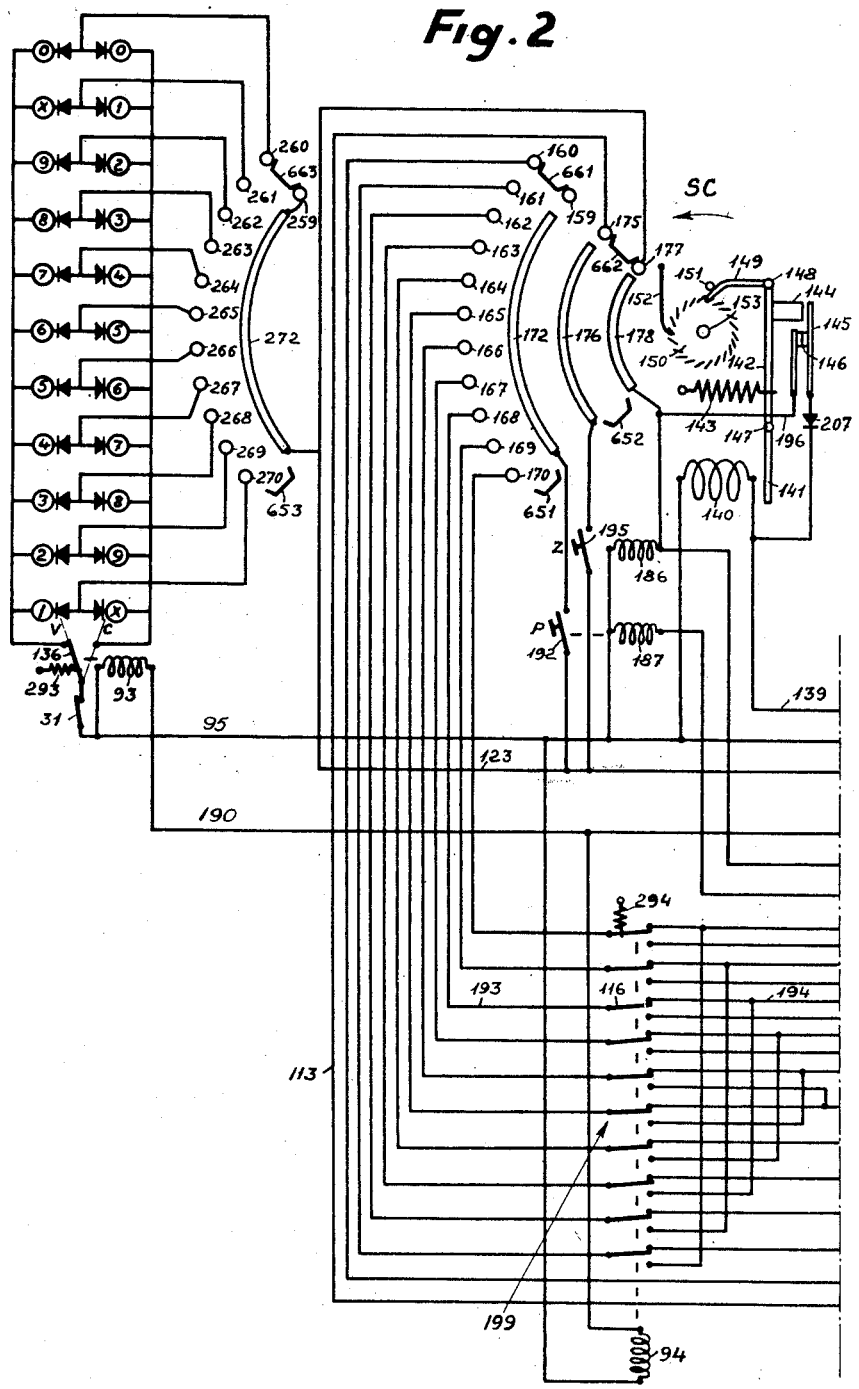
Figure 3:
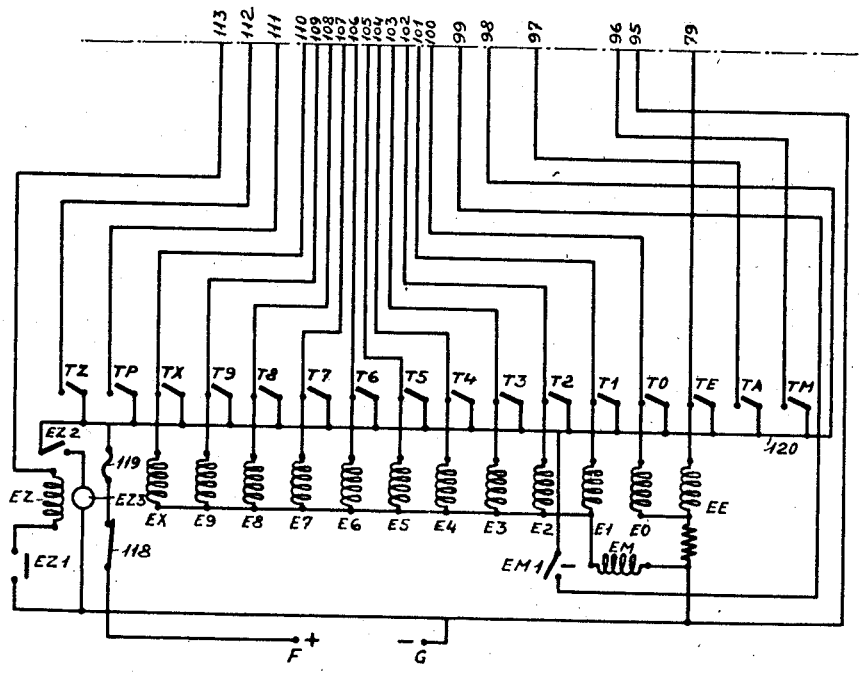
Figure 3 shows diagrammatically the keyboard for the electric control of an accounting machine or of a machine for punching perforated cards in association with a checking arrangement.

The punching machine comprises the usual keyboard with keys bearing numbers ranging from 0 to 12 and a space key TE bearing the letter "E." A key TX (also called key "X"), bears the numeral "11," and is for punching the symbol, which represents 10 as a checking symbol. A key bearing the letter "T" serves for tabulation. The keyboard of the punching machine is also provided with keys TM, TA, TP and TZ. The key TM bears the letter "M" and is for starting the checking arrangement; the key TA bears the letter "A" and is employed for cutting off the current from the checking arrangement for stopping purposes; the key TP bears the letter "P" and is for controlling the punching or the striking of the checking symbol and the key TZ bears the letter "Z" and is for controlling the return to 0 of the counter of the checking arrangement. Corresponding keys bearing the letters "M," "A," "P" and "Z" are provided on the checking unit for control from one arrangement or the other. The keys bearing the letters "M," "A," "P" and "Z" are therefore not essential in the punching machine. In the checking unit, a switch 31 is provided for rendering the symbol indicator inoperative. A switch 32 is also provided to break feeding line 190 of electromagnets 92 and 93; then contact blades 126 and 136 are always on their contact V and the values of the figures sensed are then always entered in their true value on counter SC. A circuit-breaker 33 cuts out the control of the release of the card carriage of the machine by the checking unit. In the diagrams of Figures 1, 2 and 3, the keys, contacts and circuit-breakers are designated by the same references as in Figure 4. The arrangement of Figures 1, 2 and 3, to produce the complete circuit diagram, is indicated in Figure 13.

The indicating windows 135 (Figure 4) in which the figures 0, 1 . . . 9, and X, appear, correspond to the indicating lamps of Figure 2. However, each group of two lamps of like number of Figure 2 is located below the same window (Figure 4).

The punching machine (or alternatively, an accounting machine, or an electrically controlled typewriter) comprises, in principle, electromagnets EO to EX (Figure 3) for effecting the striking or punching. An electromagnet EE controls the release of the carriage of the machine for the spacing in the striking or punching, said electromagnet EE being under the control of a key TE, or of an impulse coming from a contact stud 70 of the transmitter SE of the checking unit (Figure 1), through the connections 191—79.

An electromagnet EM, in series with the electromagnets EI to EX, is arranged to close a contact EM1, thereupon starting the transmitter SE of the checking unit for one cycle. When the counter SC (Figure 2) of the checking unit is at 0, an electromagnet EZ (Figure 3) may be energised through the line 113 upon closing of the contact EZ1 controlled by the carriage of the machine. Energisation of contact EZ1 closes the contact EZ2, which energises the device EZ3 for releasing the carriage of the machine.

Figure 4:
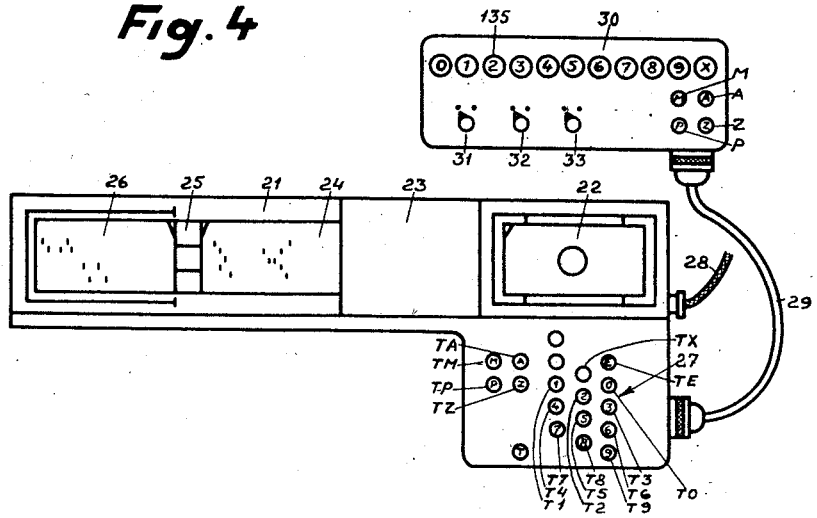
Figure 4 shows a diagrammatic plan view of an electric punching machine connected to a checking arrangement adapted to give visual indications.

F and G (Figure 3) indicate, respectively the positive and negative terminals for the supply of current to the machine, the terminals being connected to the cable 28 of Figure 4. The selector-transmitter part of the checking unit represented in Figure 1, comprises the actual transmitter, which is designated by the letters SE. In the example described, the transmitter comprises a change-over switch controlling a step-by-step automatic telephone selector having eleven positions. The various parts of the transmitter are mounted on a frame (not shown). An electromagnet 40, when energised, attracts a blade 41 connected to a lever 42 which rocks about a pin 47. The attraction of the blade by the electromagnet 40, tensions a spring 43, and an insulating push rod 44 mounted on the lever 42 displaces the blade 45 so as to open a contact 46. Secured to the end 48 of the lever 42, is a pawl 49 adapted to engage with the toothed wheel 50 formed with forty-four teeth. When the electromagnet 40 is no longer energised, the spring 43 acts on the lever 42, causing the pawl 49, to engage the wheel 50 and rotate the latter by one tooth, in the direction of the arms, the movement of the pawl 49 being arrested by the stop 51. A counter-pawl 52 prevents the wheel 50 from returning when the pawl 49 is retracted under the action of the electromagnet 40. In its rotational movement about the shaft 53, the wheel 50 drives four rows of double contact brushes keyed at 90° apart, the four rows comprising those indicated at 551—552, and 561—562, in Figure 1, and two other rows (not shown), the respective brushes of which will be assumed, for the sake of clarity, to bear the references 571—572 and 581—582. These brushes move, during the rotation of the wheel 50, over contact studs and sectors arranged in different superposed banks. As shown in Figure 1, the selector-transmitter SE comprises two pairs of banks of contacts. In the upper bank, eleven contact studs 60 to 70 are spaced over a quarter of a circle. In the immediately subjacent bank, an input stud 59 and a contact sector 72 are successively brought into contact with the studs of the upper bank by the brush 561 which, in the initial position, connects together the studs 60 and 59. In this same position, the brush 551 of the preceding row of brushes is no longer in contact with the stud 70 nor with the sector 72.

The selector-transmitter comprises a further pair of banks of contacts, one bank containing an input stud 75 and a contact sector 76, and the other bank, which is similar, an input stud 77 and a contact sector 78. These two contiguous banks are electrically connected together by a brush 562 shown in contact with the input studs 75 and 77. In its displacement about the pin 53, the brush 562 places the conductor sectors 76 and 78 in contact, whereafter it moves to the inoperative position occupied (see Figure 1) by the brush 552 of the preceding row. It is replaced at this moment between the studs 75 and 77 by a brush 572 of the following row (not shown).

The selector-transmitter SE (Figure 1) functions in the checking arrangement in combination with a series of relays. These relays R1 to R10 (or RX) each control one cut-off contact C1 to C10 (CX) and a holding contact M1 to M10 (MX). They may be energised respectively by the lines 101 to 110 extending from the electric keyboard of the machine to be checked. Unidirectional elements, for example unidirectional contacts formed by dry rectifiers or the like, indicated at A1 to AX, are provided to prevent the holding contacts of the relays R1 to R10 from maintaining in the energised condition the electromagnets E1 to EX of the keyboard which controls the machine and is shown diagrammatically in Figure 3.

At 80 there is provided a relay for cutting off the holding current of the relays R1 to R10. This relay is preferably a slightly retarded relay. It is energised at the end of the cycle on the passage of a brush over the stud 70 of the selector-transmitter SE and opens the contact 81 feeding the holding circuits of the relays.

Also at the end of the cycle of SE, that is to say, at the end of one quarter turn of the shaft 53 of the wheel 50, the electromagnet 82 of a reversing relay is energised at the same time as the energisation of a relay 80 for disconnecting the holding circuits of the relays R1 to R10. In the case of Figure 1, the reversing relay operates as follows: when the electromagnet 82 is energised, it attracts an armature 83 which rocks about a pin 84; when the armature 83 is attracted, it flexes a spring 85 which withdraws, by a determined number of teeth, a pawl 86 from engagement with a toothed wheel 87. When the electromagnet 82 is no longer energised, the spring 85 acting on the pawl 86 turns the toothed wheel 87 through a quarter of a turn until the pawl 86 encounters the stop 55. Keyed on the shaft 87 is a cam 88 which, according to its position, raises or lowers a contact blade 89 on to or from a contact 90. The coil 82 may also be energised through the line 91, two unidirectional elements 202 and 203 preventing return currents. Lowering of the blade 89 on to the contact 90 of the relay 82, which controls the switching, energises the reversing relay 92 in Figure 1, and the relays 93, 94 in Figure 2, when the circuit-breaker 32 is closed. This brings to the position C, the contact blades 126 (Figure 1) 136 (Figure 2), and the series of blades 116 (Figure 2), of the said relays, which relays are normally held in the position V, by the action of the return springs 292, 293 and 294.

The checking counter SC shown in Figure 2, comprises a driving mechanism containing the same elements as the selector-transmitter SE. Similarly, it comprises a bank of contact studs 160 to 170 and a contiguous bank with an input stud 159 and a contact sector 172. A brush 661 places the studs 160 and 159 in contact at the start (position 0). A bank is also provided which comprises an input stud 175 followed by a contact sector 176 and another bank comprising an input stud 177 and a contact sector 178. These two banks are traversed by a brush 662 which, in the initial inoperative position (position 0), establishes contact between the studs 175 and 177, closing a control circuit for the 0-position of the selector. Generally speaking, the parts of SC identical to those of SZ bear references derived from those of SE by adding 100.

In the example shown in Figure 2, there has been added to the counter SC an indicator bank comprising the studs 260 to 270 and a bank comprising an input stud 269 and a contact sector 272. A brush 663, on the same row as the double brushes 661—662, is driven by the wheel 150 in its rotational movement. The object of this indicator is to cause to appear in one of the windows 135 of the checking arrangement 30 (Figure 4) the checking figure or symbol for the number formed by the figures dealt with. The indicator operates in combination with the relay 82 controlling the reversal, which controls through the coil 93 the movements of the contact blade 136. According to the position which it occupies on the studs 260 to 270 (the position 0 corresponding to the stud 260, the position 1 to the stud 261, and so on up to the position 10 for the stud 270), the brush is always capable of lighting up one or other of the lamps of one set of two lamps, and it is the position of the contact blade 136 which determines, through the circuit which it closes, which of these two lamps will be switched on.

In Figure 2, these lamps are shown in two vertical rows comprising, from top to bottom, the lamps 0, X . . . 2, 1 on the left-hand side and the lamps 0, 1 . . . 9, X, on the right-hand side. In Figure 4, the lamps corresponding to one symbol are assembled below the same window, so that regardless of whether it is the lamp 8, for example, which is shown in the left-hand row (the fourth from the top in the diagram of Figure 2), or the lamp 8 (the ninth from the top) in the right-hand row, which is lit up, it will be the same window of the checking arrangement 30 which will be illuminated.

It will be understood that any equivalent signalling system may be substituted for that hereinbefore described.

It will be seen from Figure 2 that a contact 195 is provided for returning the checking counter SC to 0. This contact corresponds to the key Z of the checking unit 30 (Figure 4). Once closed, it is maintained by the electromagnet 186 throughout the period of the return of SC to zero. This return of SC to zero may also be effected by means of the key TZ of the keyboard which, by directly exciting the electromagnet 186, closes the contact 195 of the checking arrangement.

A contact key P on the checking arrangement makes it possible, by closing 192, to initiate the automatic punching or impression of the checking symbol corresponding to a number entered in the checking arrangement. This contact may also be controlled by depressing the key TP of the keyboard of Figure 3, which directly excites the electromagnet 187 and closes the contact 192. The electromagnet 94 controlled by the reversing relay 82, controls through the reverser 199 carrying all the blades 116, the passing of the current to the appropriate electromagnet (E0 to EX) for automatically recording the checking symbol, as will hereinafter be more fully explained.

The operation of such a checking arrangement adapted for use in association with an electrically operated keyboard machine is as follows: the punching machine diagrammatically shown in Figure 4 is an electrically operated punching machine with automatic feed and ejection of a type known per se. To start the checking arrangement, depression of the key TM (Figure 4—see also Figure 3) of the keyboard 27 closes a circuit which is formed as follows: positive terminal, circuit breaker 118, fuse 119, line 120, contact TM of the keyboard, line 96 (junction cable 29 between the checking arrangement 30 and the punching machine, Figure 4), electromagnet 121 (Figure 1) and return to the negative terminal through the line 95. The energized electromagnet 121 closes the contacts 127, 128 and 129. The contact 127, fed by the contact 130 normally closed, maintains 121 in the energized condition. 128 applies positive voltage to the line 123 of the checking arrangement. When closed, 129 energizes the electromagnet 40 of the selector-transmitter SE through the contact EM1 and the line 99. The checking arrangement also comprises a key M (Figures 1 and 4) for manually closing the contacts 127, 128 and 129.

The checking arrangements is rendered inoperative by depressing the stop key A of the checking arrangement, or the key TA of the keyboard which, by directly energising the electromagnet 122 (Figure 1) opens the contact 130 by which the electromagnet 121 is maintained in the energised condition.

The automatic feed mechanism of the punching machine having been started, a blank card is withdrawn from the magazine 22 and is then automatically positioned below the line of punches of the punching unit 23 in order to receive a record in a predetermined zone, the number 3204 with its checking symbol, for example, to be recorded thereon.

The key T3 of the keyboard (Figure 3) is depressed. The corresponding contact is closed and the electromagnet E3 energised causing a perforation 3 to be punched in the card. At the same time, the relay R3 of Figure 1 is energised through the line 103 of the junction cable, thereby opening contact C3 and closing the holding contact M3.

The circuit of the electromagnet E3 (Figure 3) is closed at the negative terminal by the electromagnet EM, which closes its contact EM1, and the latter, through the line 99 of the junction cable, the closed contact 129 (Figure 1) the line 124 and the unidirectional cell 206, energises the electromagnet 40, which biasses the spring 43 of the stepping mechanism of the selector-transmitter SE. At the same time, a circuit is formed by the line 125, the stop cell 205, the back contact (position V) of the reversing relay 92, the line 139 (Figure 2) and the electromagnet 140, which biasses the spring 143 of the checking selector SC. The unidirectional cell 207 prevents the electromagnet 186, for the return to zero, from being energised when electromagnet 140 is energised with the contact 146 still closed. When the operator releases the key 3 of the keyboard, the contact EM1 is opened, the electromagnet 40 is no longer energised, the spring 43 is able to operate and, through the pawl 49, moves the selector SE forward by one step. At the same time, SC also moves forward by one step under the action of its spring 143. The brush 661 of SC moves on to contact stud 161 and the brush 561 of SE moves on to stud 61. The brush 562 becomes engaged between the sectors 76 and 78 and, through the closed contact, energises the electromagnet 40, which again biasses the spring 43, but in this movement the contact 46 is opened, the electromagnet 40 again releases the armature 41, the wheel 50 moves forward by one step and so on until the brush 562, taking the place of 552, cuts off the current between the sectors 76 and 78.

The following double brush 571—572 (not shown) takes up a position between the studs 59—60 and 75—77. During this movement, in the course of which the shaft 53 completes one quarter of a turn step-by-step, the brush 561 passes over the studs 61 to 70 and successively places them under voltage. It must be noted that the relay R3, which is maintained in the energised condition by M3, opens C3. On passage of the brush 521 over the stud 61, an impulse is transmitted to the electromagnet 140, which biasses the spring 143 in order to move the selector SC forward by a further step during the cutting-off of the current as the brush 561 passes from the stud 61 to the stud 62. A further impulse is transmitted from the stud 62 through the closed contacts C2 and C1 to the electromagnet 140, which biasses the spring 143 for a third step of the selector, which step is completed during the passage of 561 from 62 to 63. The contact C3 being open, the impulses coming from the studs 63 to 70 are not transmitted to the electromagnet 140. The brush 661 of the counter SC, therefore remains on 163. As it passes on to the stud 70, the brush 561 energizes the electromagnet 80 which opens the contact 81. The relay R3 is de-energised, the contact M3 opens and C3 closes. The electromagnet 82 is also energized for sufficient time to bias the spring 85 which then causes the wheel 87 carrying the insulated cam 88 to perform a quarter turn. The contact blade 89 encounters the contact 90 and energises the electromagnets 92, 93 and 94 through the line 190 and the circuit breaker 32 (closed). Each of these energised electromagnets causes the contact blades which it controls to pass from the position V to the position C. The brush 663 of the indicator bank SC being on the stud 263, the lamp 3 will be illuminated, indicating the figure "3" which, placed to the right of the figure "3" which has just been recorded, forms the number 33 divisible by 11.

The escape of the punching device in order to pass to the next column of the card is usually effected automatically at the end of the perforation. However, in other machines, this escape can be effected by means of an impulse sent to the line 191—79 through the stud 70, at the end of the transmission cycle of the selector-transmitter SE. In order to enter the second figure of the number 3204 the key T2 of the keyboard (Figure 3) is depressed. The electromagnet E2 is energized and causes a perforation "2" to be made. The relay R2 is energised and at the same time closes its holding contact and opens the contact C2. EM is energised and closes EM1, and the electromagnet 40 of SE is energised. The procedure is the same as before, but as the contact C2 is open and the electromagnet 92 has brought its contact blade into the position C, it is the impulses coming from 62 to 70 (i. e. nine impulses the complement of 2 to 11) which are transmitted to the electromagnet 140, and SC advances by nine steps. The brush 663 of the indicator bank SC, having left the position 263, will be replaced on the row of studs by the brush 673 of the following row of brushes (not shown) which will move to the position 261. When the transmission cycle is complete, SE energises 82 and the cam 88 lifts the blade 89. The de-energised electromagnets 92, 93 and 94 allow the blades which they control to return to the position V under the action of their return springs. The brush of the indicator being on the stud 261, and the blade 136 on the position V, it is the lamp X which will be lit up, indicating that the symbol of the number 32 is X, which represents 10. In fact, 320+10=330, which is divisible by 11.

The indications furnished by the indicator are not yet utilised since all the integers or figures of the number to be dealt with are not recorded. The third figure of 3204, which is "0," is then struck, and the energised electromagnet EO records a perforation in the position "0" of the following column of the card and, through the line 100—91 and the unidirectional element 202, directly energises the electromagnet 82 of the reversing devise, and the contact 89—90 closes and 92, 93 and 94 are energised. The blades which they control return to the position C. The brush in contact with the stud 261 remains in position but, owing to the switching of blade 136, the lamp X is extinguished and the lamp 1 lights up. The checking symbol of 320 is "1." In fact, the number 3201 is divisible by 11.

The last figure of 3204 is "4." The reversing relays are in the position C. The depressed key T4 closes a contact which energises the electromagnets E4 and R4. The contact C4 opens. The contact EM1, which is closed by the electromagnet EM, energises the electromagnet 40. As C4 is open, the impulses coming from the studs 64 to 70 are transmitted to the electromagnet 140 which thus receives seven impulses (complement of 4 to 11). SC passes from the first position to the eighth position (that is, from the stud 161 to the stud 168). When the transmission cycle of SE is complete, the electromagnet 82 is energised by the stud 70 and causes the reversing devices to move to the position V. The lamp 3 (to the left in Figure 2) of the indicator is lit up and indicates the checking symbol "3" of the number 3204. This symbol can be punched in the card immediately following the number or with a suitable spacing.

The switching devices being on the position V and SC on the eighth position, the key 3 of the machine is depressed in order to record the figure "3," which is the checking symbol. The contact C3 of the relay E3 is opened, and three impulses are transmitted to the electromagnet 140. SC completes three steps and the following row of brushes takes up the position 0.

The machine checked may be provided with a carriage-locking device to prevent it passing to the following zone of the card should the last figure struck not have returned the checking arrangement to 0. In this case, the tabulator of the machine closes a contact EZ1 while the carriage is locked. A circuit is closed through the negative terminal, EZ1, the electromagnet EZ, the line 113, the stud 175, the brush 662, the stud 177, the line 123, the contacts 128 and 118 and the positive terminal. EZ, which is energised, closes EZ2, which actuates the device EZ3, which releases the carriage of the machine and permits the jump to the following zone of the card or even passage to a following card. If this circuit is broken between the studs 175 and 177, this movement cannot take place.

The electromagnet EZ can be employed to effect this release automatically when it is energised. The checking arrangement of the example described is also capable of automatically effecting the recording (punching or impression) of the checking symbol of the number dealt with, as will later be explained.

At the instant when the last integer or figure of 3204 has been recorded, the checking counter SC being on the position 8 and the reversing device in the position V, the indicator indicates "3."

For the automatic punching of the symbol, the operator need not know the checking symbol. He depresses the key TP of the keyboard or the key P of the checking arrangement, the first operation having the effect of energising the relay 187 and of closing the contact 192. In these two cases, a circuit is therefore made: through the positive terminal contact 118, fuse 119, line 120—98, contact 128, line 123, contact 192, conductor sector 172, brush 651 (or 661—671—681), stud 168, line 193, reversing relay 199, line 194, line 103. The electromagnet E3 of the recording arrangement is energised and records the symbol "3." Furthermore, R3 is energised, EM closes EM1 and everything happens exactly as if the key 3 of the keyboard had been depressed in order to record the symbol "3." SC advances by three steps and returns to zero. EZ, which is energised, releases the carriage.

Should the operator inadvertently strike the wrong key during the transmission of the checking symbol, the checking counter SC is not returned to zero, and the carriage remains locked. In order to release the carriage, it is then necessary to return SC to zero. For this purpose, the key Z of the checking arrangement or TZ of the keyboard is depressed. Either of these operations results, either directly or through the energisation of the electromagnet 186, in the closing of the contact 195. As SC is not at zero, a brush is situated between the sectors 176 and 178 and forms a circuit: positive terminal, contact 118, fuse 119, line 120—98, contact 128, line 123, contact 195, sector 176, brush 652 (or 662, etc.), sector 178, line 196, contact 146, stop element 207 and electromagnet 140. Moreover, the electromagnet 186 is kept energised by the contact 195 which is maintained, and the electromagnet 140 of the sector SC, fed by the contact 146, acts as a buzzer until the operative brush has left the sectors 176 and 178 and another brush moves into the position "0" between the contact studs 175 and 177 in order to release the carriage of the machine by energising EZ.

The position of the switching devices at the beginning of a checking operation is immaterial because the contacts corresponding to the relays 92 and 93 are both active and are coupled. This will be seen on examination of the two examples. In the first example described, the switching devices being initially in the position "V," there are obtained:

```
Figures successively entered on the keyboard_____ 3  2  0  4  3
Position of the relay blade 126 before the entries of
  these figures_____V  C  V  C  V
Position of SC after the entry of each of these figures
  (SC being at "0" at the beginning)_____ 3  1  1  8  0
Position of the relay blade 136 before the entries of
  these figures_____V  C  V  C  V
Indications of the indicator_____ 3  X  1  3  0
```

If the switching devices had initially been at the position "C," there would have been obtained, as second example:

```
Figures successively entered on the keyboard_____ 3  2  0  4  3
Position of relay blade 126 before the entry of these
  figures_____C  V  C  V  C
Position of SC after entry (SC being at "0" at the
  beginning)_____ 8  X  X  3  0
Position of relay blade 136 before the entries of these
  figures_____V  C  V  C  V
Indications of the indicator_____ 3  X  1  3  0
```

The result is exactly the same as before.

The unidirectional element 207, as already mentioned, prevents the circuit used, for the return to zero, from being energized when electromagnet 140 is energised through the line 139. The unidirectional element 205 preserves SE of the impulses applied to the electromagnet 140 during a return of SC to zero. The unidirectional element 204 prevents the impulses transmitted to 140 by the contact C of 292 from setting the electromagnet 80 for the de-energisation of R1 to R10 and the reversing relay 82 from being operated, or from starting the escape through the line 191—79.

The unidirectional element 202 prevents the end-of-cycle impulse of SE at the stud 70 from initiating the recording of an "0" by E0 energised by the line 100.

The unidirectional element 203 prevents SC from being advanced by one step during the recording of an "0," and prevents the escape from being prematurely initiated by the line 191—79.

The stop element 201 prevents, when the escape key of the keyboard is depressed, the passage of impulses towards SC through the connections 191 and 139.

In the form of the checking arrangement hereinbefore described, the figure "0" is not dealt with in the same way as the other figures. It will nevertheless be simple to provide an arrangement in which all the figures act in exactly the same way. However, it is obvious that it is advantageous to effect a saving of time by eliminating the case where this value unnecessarily arises in the apparatus for its complement to eleven, which is eleven. When a "0" is entered, it is sufficient to ensure the control of the reversing devices 92, 93 and 94 in the manner explained.

In order to permit checking of subsequent recordings, it is desirable to make the checking symbols appear on the original cards, even when the latter are not provided on a machine in association with an automatic arrangement for determining the checking symbol. It is always possible to determine the checking symbol by mental calculation, but the chances of error are practically eliminated by employing an indicating checking arrangement for determining the checking symbol.

In this case, the checking arrangement according to the invention may be simplified and need not comprise the recording device, but merely an arrangement for automatically composing the checking symbol.

The figures of the number to be checked are struck successively, commencing with the first indicative figure to the left. It is sufficient to record on the card, after the number dealt with, the symbol indicated by the checking arrangement. This symbol, which is struck in turn on the keyboard of the checking arrangement, returns the indicator to zero, which constitutes a verification of the checking symbol itself and returns the checking arrangement to the initial position for a further operation.

Owing to the fact that the checking symbol is displayed on the original cards, it is possible, in subsequent recording on machines provided with checking arrangements, to record from right to left or from left to right the figures of the numbers thus formed, without modifying the final indication, which must always be zero in the checking arrangement, when the recording is correct.

In an alternative embodiment, the invention is applied to an automatic machine for punching checking symbols, which can also be employed for checking recorded numbers accompanied by their symbols on perforated cards. In this case, the perforations or other marks appearing on the cards control the checking arrangement through suitable means for reading the cards. The machine diagrammatically shown in Figure 5 comprises a frame 210 and a card magazine 211 for the cards to be treated. An automatic card feeding mechanism of known type engages them singly on a feed track which comprises a reading brush arrangement 213 (the contacts of the brushes of which, disposed on a line L—L, correspond to the control keyboard of the preceding example) and a punching unit 214, the punches 215 of which are disposed on a line K—K at a short distance from the line of relays of the reading brush arrangement 213. The cards are automatically ejected after treatment into a collecting magazine 217, or selected in a magazine 218. The checking unit shown in association with the machine conforms in its general arrangement to the general diagram of Figures 1 and 2, except that the indicating device of Figure 2 is not required in this embodiment. The start, stop and return-to-zero keys of the checking arrangement are indicated at TM', TA' and TZ'. 313 is a circuit-breaker, the object of which will later be described.

In addition to the automatic card feeding and ejecting mechanism, the machine comprises an automatic jumping device of known type which places the cards in position and sets the checking arrangement in operation for each card only for the zones predetermined by the adjustment of an electric tabulator. The checking arrangement operates in conjunction, on the one hand, with the brushes of the exploring arrangement for reading the numbers and, on the other hand, with the electromagnets of the punching arrangement when the machine is required to punch automatically the checking symbols of these numbers.

In Figure 6a, the following essential parts are shown:
A "distributor" D1.
The set of reading brushes 230 to 240
The set of punching electromagnets P0 to PX
A combination of relays and contacts and, more especially: an electromagnet 301 for the release of the card carriage; an electromagnet 324 controlling the checking operation; an electromagnet 305 for sorting out incorrect cards; an end-of-control electromagnet 345; an electromagnet 328 controlled by a zero perforation; an electromagnet 323 for the general control of the perforation; an electromagnet 325 for the control of the perforation by a "0."

It is also to be noted that the complete arrangement is constituted by the combination of Figures 1, 2 and 6a (see assembly in Figure 14), the mechanism of Figure 6a being carefully substituted for that of Figure 3.

The distributor DI comprises a contact straight-edge 219 against which a slide 218 of the card carriage of the machine bears with friction in its movements. This slide passes over insulated contact studs 225. All these studs can be brought into contact with one or other of the lines 220 to 223 by means of movable straps or riders such as 276, 310, 320, 330 (see also Figure 6b, which shows a different method of using the same distributor). The distributor may be rectilinear or circular and tall or flat, without departing from the scope of the invention.

The modified form of the invention will first be described in its use as a checking apparatus.

It will be assumed that the checking arrangement has previously been set in operation by depression of the key TM', the effect of which is to energise, through the connection 96, the electromagnet 121, which closes its contacts and in particular applies voltage to the line 123.

Therefore, assuming that it is desired to check numbers accompanied by their checking symbol, for example 478 followed by the number "5" serving as a checking symbol, these numbers being located in a predetermined zone of the card, the tabulator is set so as to stop the cards on the first figure of the zone to be dealt with.

Due to the automatic jump, the perforated card is brought into a position (corresponding to the figure "4") below the line of brushes 230 to 240. The slide 218 is at the same time brought on to the stud 273.

The circuit is formed as follows: positive terminal, line 227, contact straight edge 219, slide 218, stud 275, strap or rider 276, connecting bar 220, line 226, electromagnet 324, contact plates 246 and 246a and, through the perforation "4" of the card, brush 234, unidirectional element 254, line 284—104 and electromagnet R4 (Figure 1). The contact M4 is closed and the contact C4 is opened. The contact 300 of the electromagnet 324 is normally closed and opens with retardation when 324 is energised, and the line 99 is placed under voltage. During the lag in the opening of the contact 300 of the electromagnet 324, the line 99 energises the electromagnet 40 (Figure 1) and flexes the spring 43 of the selector-transmitter SE. On opening of the contact 300, the electromagnet 40 being de-energised, the transmitter SE commences a cycle and, by the impulses transmitted to SC, records the figure "4" at its own value or as its complement to 11, according to the position of the switching relay 92.

At the end of the cycle, SE sends through the line 79 an impulse which energises the escape electromagnet 301. The card carriage advances by one column, the slide 212, which moves with the card in the direction of the arrow, takes up a position on the following stud 277. The figure "7" is dealt with, whereafter the slider moves to the following stud for "8" and then the next stud for "5."

The symbol has been so selected that the number being dealt with (4785) is divisible by 11. The checking counter SC must therefore be returned to zero through the last figure of this number. The line 113 is therefore placed under voltage and the electromagnet 345, being energised, opens the contact 303 and closes 304. After the last figure of the number to be checked has been dealt with, the slide passes on to the following stud 302.

The electromagnet 345 being energised and the contact 304 closed, the escape electromagnet 301 is energised and brings about the escape, whereby the card carriage is brought under the influence of the automatic tabulating arrangement (a known arrangement), which causes the analyzing brush arrangement to move to the following zone to be treated on the card, or brings about the ejection of the card, whereafter another card is fed into the treatment position.

If, on the other hand, the checked number is not divisible by 11, SC is not returned to zero, the relay 345 is not energised, the contact 303 remains closed, and the current is then fed to a two-way change-over switch 313 set by hand. In the position 314, the electromagnet 305 is energised and sets the selecting arrangement in operation in order that the incorrect card may be sorted out as an erroneous card and, through the line 112, the selector SC is returned to zero, while another card is fed. In the position 313, an alarm device or a device for stopping the machine 306 is actuated. An operator must then depress the key Z for returning SC to zero (Figure 2) or the key TZ' (Figure 6a). As soon as SC has returned to zero, the relay 345 is energised, the contact 304 closes and effects the release of the card which is sorted out as an erroneous card because the manual closing of the contact Z also energises the selection electromagnet 305.

The alternative form of the invention is hereinafter described in its application to the automatic punching of the checking symbol.

For this purpose, the distributor DI is arranged as shown in Figure 6b which replaces the corresponding part in 6a.

For punching the checking symbol, the straps or riders 276 of the columns of figures or integers to be dealt with are followed by a number of escape straps or riders 310 connected to the line 221, which are intended to bring the column, according to the number dealt with, below the line of punches. The slide 216 is then brought on to a contact stud connected by a strap or rider 320 to the line 222 controlling the punching. The electromagnet 323 is energised and closes the contact 324 for returning the punching electromagnets PO to PX on to the negative terminal.

Moreover, the line 111 placed under voltage by the line 222 energises the electromagnet 187 (Figure 2) which closes the contact 192. It is known that in the example selected the line 285 corresponding to the figure "5" will be placed under voltage by the counter SC, and the electromagnet P5 will be energised and will bring about the punching of a perforation 5.

The placing of the line 105—285 under voltage energises the corresponding relay R5 (Figure 1). The punching of a perforation other than "0" energises the electromagnet 325 in series with any punching electromagnet, which closes the contact 325a, the closing of which sets the transmitter SE into operation through the line 99, and due to the entry of the checking symbol in SC, returns it to zero. It is possible, but not necessary, to check the return of SC to zero by the punching of the checking symbol. This check may be made by means of a connection 330 (Fig. 6b) and the electromagnet 345 energised by the line 113, as previously described.

The unidirectional cells 230 to 240 in series with the brushes prevent short-circuiting of the lines 279 to 289 by the contact plate (or roller) 246, 246a when the brushes are not all insulated from the plate by a card, which would have the effect of setting in operation punches other than that desired.

Similarly, the unidirectional element 340 has the object of preventing the placing under voltage of several of the lines 279 to 289 through the electromagnet 324 when the closing of the contact 325a passes the current through the line 99.

During the reading of a perforation "0," the electromagnet 328 closes the contact 328a which directly controls the escape through the electromagnet 301 without the performance of a cycle of impulses by SE.

It is obvious that certain modifications may be made in this checking arrangement without departing from the scope of the invention. More especially, the automatic selection device (electromagnet 305) may be omitted in this case.

Moreover, when it is desired to check a recorded number accompanied by its recorded checking symbol, the complete number, formed by the figures of the number and by the figure represented by the checking symbol in series, can be entered into the checking arrangement by following the series of the ranks of its decimal orders and commencing either from the lowest order or from the highest order. At the end of the checking operation, the indicator must be at zero, if at zero at the beginning.

The two examples of a checking arrangement according to the invention which have hereinbefore been described, while being effective, are attended by certain disadvantages, as will be explained, and for this reason another alternative embodiment of the invention will now be described.

It is a fact that in tabulating, calculating or other machines operated with perforated cards, the checking operations must be carried out at high speed, and very slow step-by-step mechanisms are not satisfactory. In order to overcome this difficulty, it is possible in accordance with the invention to substitute for certain elements of the checking arrangement, equivalent electronic means. Thus, there is given in Figure 8, considered alone, a diagram showing the principle of the application of a circular-chain electronic counting arrangement for counting impulses. The high recording speed of such an arrangement also allows of simplifying the transmitting arrangement.

Figure 7:
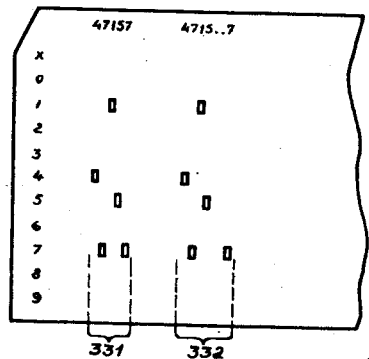
Figure 7 shows a part of a perforated card, having in certain zones numbers accompanied by their checking symbols.

The numbers to be dealt with are read by the machine either from cards such as are shown in Figure 7, or from totalisators (see Figures 8 and 11), or any other indicating or recording means expressing numbers, factors or results of calculations accompanied, if desired, by their checking symbols.

In the latter case, the checking arrangement may, as previously described, control the recording of the checking symbols corresponding to the numbers dealt with.

In Figure 7, records to be checked are provided on a card by perforations. Two methods of recording the symbol are shown at 331 and 332.

At 331, a zone of the card has perforations defining the number 47157, the last figure or integer of this number being the checking symbol. Alternatively, in order to avoid errors in interpretation during the direct reading of the cards, there is shown at 332 the checking symbol, separated by two columns from the number to be checked thereby. It would also be possible to adopt an interval of any even number of columns so as to cancel out the effects of the reversing device on the determination of the checking symbol. This arrangement, while not impairing the operation of the checking arrangement, has the disadvantage that it occupies more space on the card.

Figure 8:
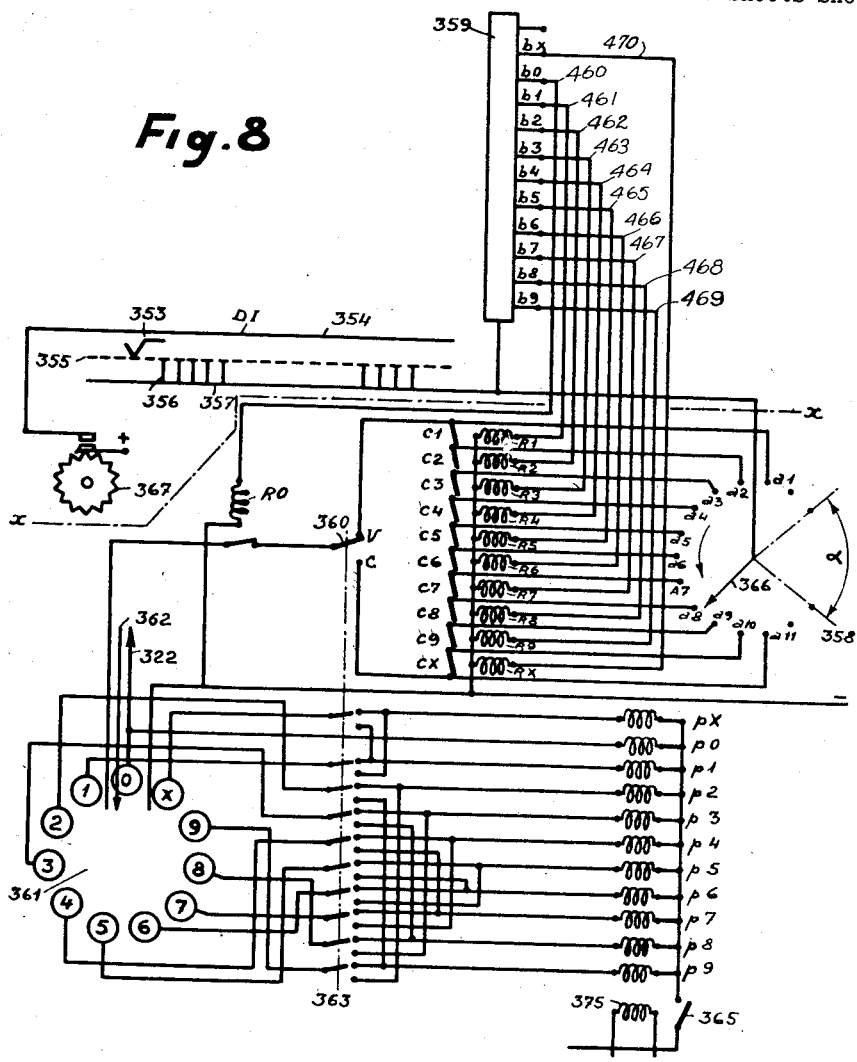
Figure 8 shows diagrammatically the principle of an alternative embodiment in which the counting means of the checking arrangement is constituted by a circular-chain electronic counter having eleven positions.

In Figure 8 are shown the characteristic parts of the checking arrangement:

The input member is constituted by reading brushes $b_9$ to $b_x$;

The output member is constituted by perforation electromagnets $p_0$ to $p_z$;

The impulse transmitter 358 is a mechanical rotary change-over switch;

The chain of selection relays comprises the group R1 to RX and the relay R0 corresponding to zero;

The switching assembly comprises the cam operated switching devices 360 and 363 which are mechanically associated;

The counting device 361 is a circular chain comprising electronic tubes.

There is also provided a distributor DI for localising the checking to the zones to be verified and a make-and-break switch 367 feeding the distributor DI with current at the required instants.

In the distributor DI, a slide 353, which follows the movements of the card, slides with friction against a current feed straight-edge 354. The contact studs 355 correspond respectively to each column of the card. Movable blocks 356 bring the contact studs 355, corresponding to the columns of the zones to be dealt with, into engagement with a contact bar 357 which sets the checking arrangement in operation. The impulse transmitter 358 makes a complete turn during the time allotted for dealing with one column, that is to say, during the total time occupied by the movement from one card of a column to the next, which time includes, if necessary, the stopping time and the escape time, because the cards can be actuated in the machine with a continuous translational movement. During the time taken by the passage of the card beneath the brush, one of the contact brushes $b_9$ to $b_x$ makes contact through a perforation in the card with the contact roller 359. The corresponding relay of the chain R1 to RX is energised and opens its contact (C1 to CX). The reversing contact 360 is automatically changed in position at each change of column on the card. This operation is controlled, for example, directly by a cam mounted on the shaft of the transmitter 358. An electronic counter 361, having a circular chain comprising eleven elements, counts the impulses coming from the transmitter 358 which are transmitted to it by the relay selector. This chain passes back through zero after each eleven impulses. A zero return circuit controlled by the connection 362 is also provided. This chain has no particular feature and can be formed with thyratrons or double triodes, or by a suitable number of tubes of any type. A reversing device having multiple contacts 363 actuated in the same way as 360 during the passage from one column to the other, places each element of the circular-chain electronic counter in communication with a punching (or impression) electromagnet $p_9$ to $p_x$ corresponding, according to the position of the reversing device, either to the value represented by the element of the circular chain energised at this moment, or to the complement of this indication to 11. The connection between the counter and the circuits which it controls may be made by means of relays suitably disposed in the circuits of the tubes, if desired with intermediate amplification. The closing of the contact 365 by the electromagnet 375 brings about the punching of the checking symbol. In the example described, the circular chain does not control any indicating device.

The operation of this alternative form of the invention is as follows: The card having been brought into the analysing position under the brushes $b_9$ to $b_x$, a circuit is closed, for example through the perforation "4." The slide 353 is on the contact stud 355 corresponding to the column explored. A strap or rider 356 places the contact roller 359 and the distributor 366 of the transmitter 358 under voltage. The time taken by the movement of the transmitter 358 corresponds to the idle time between two columns. During this time, the reversing contacts 360—363 are actuated. The relay R4 of the chain of relays, which is energised, opens the contact C4. The reversing device 360 being in the position V, the distribtutor 366 passes successively over the studs $a_1$, $a_2$, $a_3$, ... $a_9$, $a_{10}$, $a_{11}$ of the transmitter. Four impulses from $a_1$ to $a_4$ are transmitted by 360 to 361, which records them. While the transmitter moves through the angle α, the slide 353 passes on to the following stud, and the reversing device 360 passes to the position "C." The perforation "7" which follows the perforation "4" opens C7. The four impulses $a_7$ ... $a_{11}$ are transmitted to the circular chain, which records them and passes to the position "8." At the figure following "1," the reversing device 360 is on V and the contact C1 is therefore opened, the impulse "1" passes and the counter 361 marks "9." At the perforation "5," the reversing device 360 being at C, the contact C5 is opened by the relay R5, six impulses are sent and the counter 361 passes to the position "4." At the perforation "7" of the checking symbol, 360 being on V, C7 is opened, seven impulses are sent and 361 indicates zero. The line 322 energised by C6 gives a "correct" return and permits the jump to the following zone of the card. Such an arrangement easily controls a number of columns in one second. If the checking figure "7" is not to appear in perforated form following the number (4715), the same procedure is adopted as in the arrangement previously described in order to bring the following column automatically below the row of punches. For the punching of the checking symbol, an electromagnet 375 energised by the stud corresponding to the recording column closes the contact 365, the card being held fast. In the zone 332 of the card (Figure 7) the checking symbol "7" has been shown separated from the checked number by two columns. These double spaced columns, as stated, do not modify the operation of the checking arrangement. In fact, as the reversing device 360 has twice changed its position in the interval, the figure "7" is dealt with as if it immediately followed the number 4715.

In a machine comprising a checking arrangement as shown in Figure 8, when the cards to be checked are fed forward with a continuous movement during the treatment, an impulse transmitter 367 only transmits current when the brushes are well in position in the perforations.

If the circular-chain electronic counter is not returned to zero after a predetermined zone has been dealt with, the card is sorted into a special compartment (not shown) and the circular chain is returned to zero by the connection 362.

Figure 9:
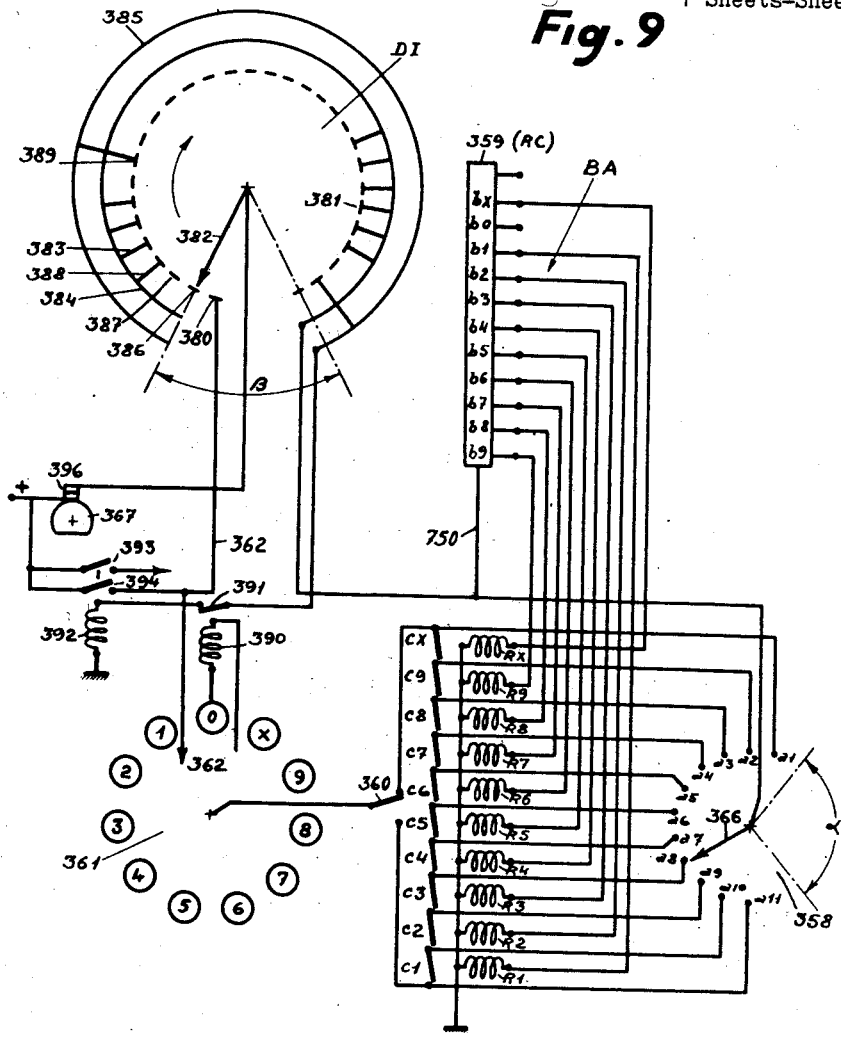
Figure 9 shows diagrammatically the principle of a selecting arrangement for perforated cards bearing incorrect particulars.
Figure 10:
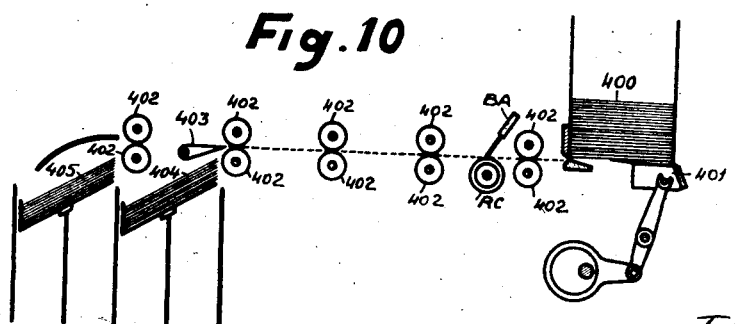
Figure 10 is a diagrammatic detail view of the selecting mechanism of Figure 9.

Figures 9 and 10 show a continuously operating checking machine having a large number of features common with the preceding arrangement (Figure 9 showing the general diagram and Figure 10 a constructional detail), but the final object and result of this machine is to sort out the cards bearing incorrect particulars, which cards are collected in a separate compartment. For this purpose, the numbers dealt with are always accompanied by the checking symbols, and the checking arrangement need not comprise any indicating or recording means (perforation or striking), but a selecting arrangement.

In the embodiment envisaged, the machine, which is required to function at high speed, comprises, in the same way as in the previous arrangement, an electronic counter comprising a circular chain with eleven positions. The distributor is preferably rotatable with a number of active contact studs equal to the number of columns of one card.

The parts shown in Figure 9 correspond to those of Figure 8 and bear the same references for the sake of simplicity.

The cards dealt with have certain zones of numbers which it is desired to check. If there are spaces between the numbers, this is of no importance because the machine treats each space in which there is no figure, as being equivalent to zero. The last figure of the discontinuous number to be checked is the symbol. Such a method is especially applicable, for example, to the checking of particulars of insurance policy holders against more or less long numbers followed by a date, etc. The arrangement according to the invention then also allows of detecting, in addition to the errors in recording already referred to, errors in spacing.

The rotatable device DI, which is substituted in Figure 9 for that of Figure 8, comprises a number of studs 381 equal to the number of columns of the cards to be dealt with. The arm 382 of the distributor moves over these studs in synchronism with the passage of the corresponding columns below the analysing brushes $b_9$ to $b_x$. The idle angle β corresponds to the spacing provided between two successive cards. The connections made by straps or riders 383 are established between a connecting circuit 384 and the studs corresponding to the columns to be treated. The studs 381 can also be connected to a second connecting circuit 385, as will later be described.

The arm 382 of the distributor completes one revolution per card cycle. It is fed by a cam operated contact 396 and is rotated simultaneously with the passage of a column below the brushes $b_0$ to $b_x$ and the rotation of the transmitter 358, which complete one revolution per column, the idle angle α corresponding to the passage of the perforations of one column to that of the following column.

The current is delivered to the distributing brush of the transmitter 358 by the ring 385 each time the brush 382 passes over a stud 381 connected by a connection 383 to the said ring. The reversing device 360 automatically changes its position (due to mechanical or other means) at each turn of 358 through the angle α.

The impulses coming from 360 are received by the electronic counter 361 having eleven positions. Only the position 0, when operative, energises an electromagnet 390. This electromagnet opens the contact 391.

Figure 10 shows diagrammatically the arrangement of the main mechanical parts of a machine arranged to function in conjunction with a checking arrangement of the type shown in Figure 9.

The principal parts shown therein are the following:

A card magazine 400
A feed blade 401
Card-feeding rollers 402
A selecting flap 403
A magazine 404 for the incorrect cards, sorted out, and a magazine 405 for the cards checked and found correct.

The operation of the arrangement is as follows:

A card bearing, for example, the number 4103 is withdrawn from the magazine by the feed blade 401 and engaged between the forward-feeding rollers 402. When the card becomes engaged below the brush arrangement BA, the brush 382 of DI comes into contact with the "zero" stud 380. A zero-return impulse is sent through the line 362 to the electronic counter in order to return the latter to zero should it not already be there. The card advances under the brushes of the brush arrangement and presents, for example, two empty columns corresponding to the studs 386 and 387 of DI. Then comes the third column in which, for example, a "4" is perforated. The stud 388 being connected to the connecting ring 384, an impulse is sent through 750 to the contact roller 359.

As the perforation "4" of the card passes below the brush $b_4$ it energizes the relay R4, which opens C4. The reversing device 360 being in the uppermost position, seven impulses pass to 361, whereafter the current is cut off by 396 during the passage to the following column. 360 is downwardly displaced. The perforation 1 of the following column sends an impulse into the counter. Then comes the perforation "0," which is not connected to the relays, the selecting arrangement allows eleven impulses to pass and the position of the counter is not thereby changed. Then arrives the perforation "3," which is the checking symbol of the number 410, which sends three impulses to the meter, 7+1+11+3=22, which is a multiple of 11. The meter has returned to zero. The electromagnet 390 is energised and opens the contact 391. When 382 passes on to the contact 389, 391 being open, the electromagnet 392 is not energised. In cases where the complete number dealt with is not correct, the meter 361 is not returned to zero by the last figure. The electromagnet 390 is not energised, and as 391 is closed when 382 passes on to 389, the electromagnet 392 is energised and closes the contacts 393 and 394. 393 operates the selecting flap 403 and 394 causes the counter 361 to return to zero. Even if another zone of the same card is successfully dealt with the card will nevertheless be sorted out because the flap 403 will not be operated again until towards the end of the treatment of the following card.

Figures 11, 12a and 12b relate to the checking of values of numbers registered in totalizers of tabulators, or other perforated-card or like machines. A simple modification of these totalizers enables them to register the value of each checking symbol related to each registered number.

These totalizers usually comprise a number of contiguous circular banks to register the denominational orders of decimal numbers; one of these banks is diagrammatically represented in Figure 12a. To register a figure of a number, the brush 506a of such a bank is driven synchronously with the passage of the index points on a card under the sensing means of an accounting machine; when a mark at an index point representing a figure of a number, is sensed, the brush is stopped and stays on the stud (numbered 0 to 9 in Figure 12a) representative of the figure sensed. These totalizers are usually explored at rest: for each bank, the brushes (as 506a in Figure 12a) are successively set under voltage and each stud of each bank is connected for each decimal figure in parallel with the operating means of the checking device in the same way as sensing brushes $b_0$ to $b_9$ of Figure 8 are connected to relays R1 to R9 by connections 460 to 469 in same figure. These totalizers are of a known type and similar ones have been described in U. S. Patent 1,916,617 (Lake and Daly).

It is physically feasible to add another stud to one of the banks of such a totalizer to register the figure which can be representative of a checking symbol; such a symbol counter bank is shown diagrammatically by studs 0 to X and brush 507a in Figure 12b.

The combination of such a symbol counter bank with a decimal totalizer is shown diagrammatically in Figure 11. The banks of such totalizers (as well as the bank of the counter in practical appliances) are usually circular, but the diagram shows them in a plane representation for simplification.

The banks of totalizers are usually formed by a first set of conducting rods (i, h, g, f, e, d, c, b, and a) crossed apart with a second set of conducting rods (0 to 9), which second set forms both the studs of the decimal figures in each bank and the parallel connections between the studs of same decimal value for each of the banks to serve to the same ends as explained hereinabove. These two sets of conducting rods are connected by brushes acting as the brush 506a in Figure 12a; the positions of these brushes for a registered number are indicated by the blackened rectangles (506 and 508 to 515) in the example represented in Figure 11; these positions are determined as above by the sensing of a number of columns of a record card; the number represented is 4715. Such totalizers, in the cylindric forms, are of common practice in accounting machines and the adjunction of a symbol counter bank amounts only to the adjunction of a conducting rod k to the first set of conducting rods and of a separate stud completing one bank for the second set to register the symbol value X. The symbol value, indicated by 507 in Figure 11, is 7; 47157 forms a complete number divisible by 11. The supplementary symbol stud for X is connected to relay RX of the checking device by connection 470 in the same way as brush $b_x$ in Figure 8 and the second set of connecting rods is connected in the same manner by connections 460 to 470. A number of totalizers and counters can be associated in parallel by connections 460 to 470 (limited to x—x and y—y on the diagram of Figure 11) and connected to the checking device as indicated by x—x on Figure 8 in lieu of same connections and of the related sensing devices in that figure. Contacts 353 (Figure 11) are used to segregate a totalizer and a counter and contacts 452 select the totalizer and counter banks which are to be used.

An electromagnet 451, in series with the distributor brush 450, closes when energised, a contact feeding voltage to the transmitter 358 through line 357a which has the same use as line 357 in Figure 8. The distributor brush 450 (Figure 11) turns at the same time as the transmitter 358 (Figure 8), which completes one revolution for each contact stud of distributor 517 passing from one stud (516) to the other while brush 366 (Figure 8) describes the angle $\alpha$. The distributor 517 can also, in accordance with the connections made, successively check a number of totalizers and counters at each revolution. The checking arrangement of this type may be employed to verify results of arithmetical operations.

One object of the invention is to form the checking symbol for the result of an operation in accordance with the checking symbols of the operands set for this operation, irrespective of whether it is a question of addition, subtraction, multiplication or division, or of combined operations. According to the invention, the result of the operation is checked with the symbol thus obtained, and the verification of the exact suitability of this symbol with that of the result of the operation takes the place of a verification of the accuracy of the operation.

For this purpose, in order to check additions for example, the machine comprises a normal totalisator in which the numbers to be added are successively entered, and a special counter bank (k) having eleven positions 0, 1 . . . 9, X, in which are introduced the respective symbols of the numbers to be totalled. This counter bank has no carry-over. The figure indicated by this counter is the symbol of the total formed in the decimal totalisator.

It will be assumed that the following figures are to be added: (the figures placed to the right, "5," "X," "X," etc., constituting the symbols).

| | |
|---|---|
| 588,714 | 5 |
| 132,461 | X |
| 721,203 | X |
| 193,942 | 1 |
| 500,140 | 3 |
| 2,136,460 | 7 |

2,136,460 represents the total and "7" the symbol of the total. It will be seen how the symbol of the total is formed:

| Value of the symbol entered | Position of the indicating device of the symbol counter |
|---|---|
| 0 | 0 |
| 5 | 5 |
| X | 4 |
| X | 3 |
| 1 | 4 |
| 3 | 7 |

The figure indicated by the symbol counter shows at any moment the symbol of the total formed.

The total obtained, followed by the symbol formed by the addition of the symbols forms a number which, when submitted to the checking arrangement, must return the latter to zero. If this does not happen, there is a mistake.

The subtractions may be similarly effected. The case will first be assumed of a positive balance (normal arithmetical subtraction). In accounting machines operating with perforated cards, the actual subtraction is generally effected by adding to the first number the complement to 9 of the number to be subtracted. When there is a carry over, the balance is positive, and this carry over is added to the result. Thus, for example:

```
354_____ 6        534_____ 6
—274_____ X       +9725_____ +1
-----               ------
260_____ 7        10,259
                        1
                    ———————
                    260      7
```

By adding to the checking symbol of the first number the complement to 11 of the number to be subtracted the symbol of the balance is obtained. The number thus formed by writing after the result of the operation and the symbol thus obtained, namely 260_____7, treated in the checking arrangement, returns the arrangement to zero.

The case of a subtraction with a negative balance may also be envisaged. When the balance is negative, the subtraction amounts to deducting the first number from the second. The symbol of the result is therefore the addition of the complement to 11 of the symbol of the first number to the symbol of the second.

```
    534_____6 complement to 11     5
   —874       5                     +5
   ————                              ——
   —340                               X
or: 534
   ∴125=complement to 9 of 874
carry  659=complement to 9 of the balance
over step
   —340=true balance.
```

The particular performance of this subtraction brings about the formation of the symbol of the remainder.

The combination of the addition of the symbols as a magnitude or as a complement to 11 permits the automatic formation of the checking symbol during the drawing of the balance.

By way of example, the following procedure may be followed:

| Number | Symbol | Enters in the symbol counter |
|---|---|---|
| +314 | 6 | 6 |
| —215 | 6 | complement to 11_____ 5 |
| +822 | 8 | 8 |
| —514 | 8 | complement to 11_____ 3 |
| —824 | X | complement to 11_____ 1 |
| +702 | 9 | 9 |
| | | — |
| +285 | X | 32 |
| | | —22 |
| | | — |
| | | X |
| | | symbol of the result. |

In order to check a multiplication, the symbol of the product is automatically indicated by the symbol counter when there is introduced therein the product of the symbols of the factors:

```
1932          7
 ×97                  7×9=63
—————
13,524        9
              (on deduction of 5 turns of 11
17,388           points=55)
—————         the symbol counter indicates
                 63—55=8
187,404       8 is the symbol of the result
```

The checking of this result returns the checking arrangement to zero if the operation is correct.

Similarly, a division can be checked provided that there is no remainder. In this case, the relation already indicated between the symbols of the multiplicand, the multiplier and the product in the multiplication becomes a relation between divisor, dividend and quotient. This is a relation parallel to that of the operation effected on the numbers themselves, namely:

$$\frac{\text{Symbol of the dividend (to within 11)}}{\text{Symbol of the divisor}} = \text{symbol of the quotient}$$

When there is a remainder, this remainder is deducted from the dividend to obtain an identical relation. The number obtained, introduced into the checking arrangement, returns it to zero.

For example:

```
34061      49
  466     ———
          695
   251
    06
```

By deducting the remainder (6) from the dividend (34,061), there is obtained:

Corrected dividend_____ 34,055. Its symbol is: X
Divisor_____ 49. Its symbol is: 5
Quotient_____ 695. Its symbol is: 2
Operation on the symbols: X:5=2.

This symbol "2," introduced into the recording device of the arrangement for checking the quotient, returns it to zero.

It is also possible, in order to obtain the symbol of the corrected dividend, to add to the symbol of the gross dividend the complement to eleven of the symbol of the remainder.

It is to be noted that it is possible to modify the invention without departing from the scope thereof. More especially, in the arrangements described, instead of employing means for transmitting spaced multiple impulses for each figure entered, it is possible to employ a transmitter sending a single impulse fixed in point of time by its angle of rotation measured from the beginning of the reading cycle, the switching assembly means and the selection arrangement having the purpose of entering this value in a counter or totalizer alternately as a magnitude and as a complement. This method of operation is particularly applicable when the numbers to be dealt with are recorded in totalizers of tabulators or like machines.

I claim:

1. In a record card controlled machine for handling successively fed record cards, each card having the items of an amount recorded in a plurality of index points and a related checking symbol recorded in another index point, the value of said checking symbol, according to a constant arithmetical relation between said items and said symbol, being equal to an integer in a determined series of continuous integers beginning from zero, automatic means analyzing said index points to introduce successively into a counter and one by one according to their successive ranks, the values of the whole of said items of the amount and the value of said checking symbol in series alternately with their true index value and with their value complementary to the highest integer of said series of integers, said counter having a number of cyclically recurring counting positions equal to the number of integers in said series, and sensing and control means determining the operation of said machine when sensing the position of said counter at the end of the introduction.

2. A checking device as claimed in claim 1, said automatic means comprising distributing means to select the columns of the cards or strips which are to be analyzed and to ensure, even for every column devoid of record, the operation of a switching device determining the entry in alternance into said counter of said true values and said complementary values.

3. In a record card controlled machine, means for reading the values of recorded items of an amount and for reading the value of a checking symbol item recorded jointly with said amount, means for imparting a new value complementary to a constant integer successively to the value of each alternate item of the complete number formed by the amount and symbol items in series, means for entering the whole of said values and said new values representing alternately the items of said complete number successively into a counter having a number of cyclically recurring positions, means for sensing the position of said counter at the end of the entering of said values and said new values and control means to continue the normal operation of the machine only when said sensing means detect a determined position of said counter.

4. In an accounting machine controlled by a record card or strip bearing jointly a recorded number and a recorded checking symbol, the value of which symbol has been so determined as to make the complete number formed by the figures of the number and by the symbol figure in series a whole multiple of eleven, a checking device comprising: record sensing means to sense the value of each figure in said series; calculating means under control of said record sensing means to enter alternately into a cyclic counter the recorded value of said figures or its complement to eleven according to the odd or even rank of each figure in the series of figures of said complete number, said cyclic counter having eleven positions cyclically recurring; and means to sense the final position of the counter and to use for a check of the number recorded in said card or strip the result of the sensing of said final position of said counter.

5. In an accounting machine controlled by a record card or strip bearing jointly a recorded number and a recorded checking symbol, the value of which symbol has been so determined as to make the complete number formed by the figures of the recorded number and by the symbol figure in series a whole multiple of eleven, a checking device comprising: entering means, under control of sensing means exploring said card or strip, to enter successively the figures of the recorded number and is checking symbol in series into a cyclic counter, said figures being entered in the form of electrical impulses in number alternately equal to the recorded value and to the value complementary to eleven of said recorded value in dependence on the odd and even ranks of the figures in said series, said cyclic counter having eleven positions cyclically recurring; means to sense the final position of said counter and error signalling means which are set in operation, after the introduction of the whole of the number figures and the symbol figure into said cyclic counter, when the result of the sensing of the final position of the cyclic counter is different from zero.

6. In an accounting machine controlled by a record card or strip bearing jointly a recorded number and a recorded checking symbol, the value of which symbol has been so determined as to make the complete number formed by the figures of the recorded number and by the symbol figure in series a whole multiple of eleven, a checking device comprising: means for the entry in said device of the series of figures of said complete number; an impulse emitter arranged to be set in operation at the entry of each figure; a relay selection arrangement to transmit a determined number of the impulses of said impulse emitter in dependence of the value and rank in said series of the figure entered, said arrangement being under control of a two-position switch assembly throwing over its contacts alternately from one position to the other for each figure entered; and a cyclic counter having eleven recurring positions, which counter receives the impulses transmitted by said emitter through said selection arrangement and which indicates an error to a utilization device by a final position different from zero.

7. In an accounting machine controlled by a record card or strip bearing jointly a recorded number and a recorded checking symbol, the value of which symbol has been so determined as to make the complete number, formed by the figures of the recorded number and by the symbol figure in series a whole multiple of eleven, a checking device comprising: means for successively entering in said device each figure of the series of figures of said complete number; an impulse emitter arranged to put successively eleven connections under voltage for the entry of each figure; a relay selection arrangement comprising a chain of ten contacts in series, one of which is respectively opened on the entry of a distinct figure, the successive contacts of the chain being connected by said connections to the impulse emitter to transmit a distinct number of impulses for each distinct figure, and the chain being placed alternatively in communication with an output terminal by one or the other of its extremities by the operation of a two-position switching assembly, said switching assembly throwing over its contacts alternatively from one position to the other for each figure entered; and a cyclic impulse counter having eleven recurring positions, which counter receives the impulses transmitted to said terminal by the said emitter through the selection arrangement and which indicates an error to a utilization device by a final position different from zero.

8. A checking device as claimed in claim 7 for which the utilization device comprises: sensing means to sense the final position of the cyclic counter; a locking arrangement; and means for setting said locking arrangement in operation when the final position of said counter is different from zero.

9. A checking device as claimed in claim 7 for which the utilization device comprises: sensing means to sense the final position of said cyclic counter; and a displaying indicator indicating an error when a final position of said cyclic counter different from zero is sensed.

10. A checking device as claimed in claim 7, for which the utilization device comprises: sensing means to sense the final position of said cyclic counter; and a card-sorting arrangement operating when a final position of said cyclic counter different from zero is sensed.

11. In an accounting machine controlled by a record card or strip bearing jointly a recorded number and a recorded checking symbol, the value of which symbol has been so determined as to make the complete number formed by the figures of the recorded number and by the symbol figure in series a whole multiple of eleven, a checking device for detecting errors comprising: an arrangement for sensing the record; pre-set connections arranged according to the card columns where there are figures of the complete number to be checked; a distributor synchronized with the advance of the card column by column and transmitting controlling impulses according to said connections; an impulse emitter arranged to emit a determined group of impulses under control of said distributor for each figure of said complete number; a relay selection arrangement transmitting a number of impulses of said group in dependence of the value and rank in said series of the figure sensed; a two-position switching assembly throwing over its contacts under control of said distributor alternatively from one position to the other for each column sensed and a cyclic counter having eleven recurring position which counter receives the impulses transmitted through said selection arrangement and said switching assembly and which indicates an error to a utilization device by a final position different from zero.

12. A checking device cooperation with an accounting machine controlled by records on which are recorded integers representing results and initial terms of additions, subtractions, multiplications or divisions without a remainder, each recorded initial term being accompanied by a recorded checking symbol the value of which has been so determined that digits forming the successive denominational orders of said initial term adjoined in series with a digit representing said value represent a complete number which is a whole multiple of a predetermined integer which is eleven or a multiple of eleven, accounting means of said machine performing, under control of said records, with the symbol values related to the initial terms of each of said arithmetical operations, an operation analogous to the related arithmetical one; the means by which said checking device is characterized comprising: calculating and sensing means for sensing said records and for entering separately and successively representative values of the digits of the successive denominational orders of each of the results of the arithmetical operations to be checked into a counter, these digits being entered in said counter alternately with their true value and with their complementary value to said pre-determined integer according to their odd or even rank in said successive denominational orders, said counter having a number of cyclically recurring counting positions equal to said pre-determined integer; further calculating and sensing means for sensing thereafter in said accounting means of said machine the values of the results of said analogous operations and for entering into said counter, after each entered result of said arithmetical operations, the true value of the result of the related analogous operation when the last entered digit of said result of an arithmetical operation has been entered in its complementary value and for entering the complementary value to said pre-determined integer of said true value of the result of said related operation when the last entered digit of said result of said arithmetical operation has been entered in its true value; means to detect an error in said operations when said counter is not automatically reset to its initial position after the entry of each result of the analogous operations; and means to control said machine according to said detection.

13. A checking device cooperating with an accounting machine controlled by records on which are recorded integers representing results and initial terms of a division, said results comprising a remainder, each recorded initial term or said remainder being accompanied by a recorded checking symbol the value of which has been so determined that digits forming the successive denominational orders of said initial term adjoined in series with a digit representing said value represent a complete number which is a whole multiple of a pre-determined integer which is eleven or a multiple of eleven, accounting means of said machine under control of said record subtracting the value of the symbol of the remainder from the value of the symbol of the dividend to obtain the value of a corrected symbol of the dividend and dividing said value of said corrected symbol of the dividend by the value of the symbol of the divisor; the means by which said checking device is characterized comprising: calculating and sensing means for sensing said records and for entering successively representative values of the digits of the successive denominational orders of the quotient of said division into a counter, these digits being entered in said counter alternately with their true value and with their complementary value to said pre-determined integer according to their odd and even rank in said successive denominational orders, said counter having a number of cyclically recurring positions equal to said pre-determined integer; further calculating and sensing means for sensing thereafter in said accounting means of said machine the result of said division by the value of the symbol of the divisor and for entering into said counter the true value of said result of said division by the value of the symbol of the divisor when the last entered digit of said quotient has been entered in its complementary value and for entering the complementary value to said pre-determined integer of said true value of the result of said division by the value of the symbol of the divisor when the last entered digit of said quotient has been entered in its true value; means to detect an error in said subtraction or divisions when said counter is not automatically reset to its initial position after the entry of the result of said division by the value of the symbol of the divisor; and means to control said machine according to said detection.

References Cited in the file of this patent

UNITED STATES PATENTS

| Number | Name | Date |
|---|---|---|
| 1,526,467 | Ehret | Feb. 17, 1925 |
| 2,016,681 | Mills | Oct. 8, 1935 |
| 2,328,654 | Lake et al. | Sept. 7, 1943 |
| 2,388,354 | Wheeler | Nov. 6, 1945 |
| 2,416,625 | Hooper | Feb. 25, 1947 |
| 2,480,744 | Lake et al. | Aug. 30, 1949 |